Patented Feb. 28, 1939

2,149,103

UNITED STATES PATENT OFFICE 2,149,103

HARD SOLDER

Richard Schulze, Berlin-Mariendorf, Germany, assignor to General Electric Company, a corporation of New York No Drawing. Application November 24, 1937, Serial No. 176,357. In Germany December 7, 1936

1 Claim. (Cl. 75—155)

The present invention relates to hard solder and particularly to hard solder which is suitable for joining objects made of copper, brass, or like material.

Prior to the present invention, it has been customary in joining brass objects to employ hard solders containing up to about 30 per cent silver. Some of the hard solders have contained in addition up to about 5 per cent phosphorus. Phosphorus-copper solders containing about 8 per cent phosphorus with the remainder copper, also have been used for joining brass parts but are very brittle. Other hard solders heretofore employed in soldering brass have contained up to about 10 per cent nickel.

All the prior hard solders which do not contain silver as an essential ingredient have a relatively high melting point in the neighborhood of about 725° C. and are inferior to silver solder in both their flowing and binding characteristics. On the other hand, hard solders containing silver are very expensive.

It is an object of the present invention to provide a relatively inexpensive hard solder which has a relatively low melting point, which flows freely and forms a secure junction between copper or brass parts and which has substantially the same properties as hard silver solder.

In carrying out the present invention, an alloy solder is made which consists of approximately 1 per cent silicon, an appreciable amount and up to about 5 per cent phosphorus, about 58 per cent to 68 per cent copper with the remainder zinc. This alloy is a solder which, so far as its flowing and binding properties are concerned, does not differ from copper-silver solder containing up to about 30 per cent silver. The mechanical properties of the joint produced with the solder is very good, and its low melting point, approximately 670° C., permits perfect soldering of material such as copper, brass, and the like.

What I claim as new and desire to secure by Letters Patent of the United States is:

A hard solder containing about 1 per cent silicon, an appreciable amount and up to about 5 per cent phosphorus, about 58 to 68 per cent copper with the remainder zinc.

RICHARD SCHULZE.